March 28, 1961    G. H. SHERER    2,977,490
SHADED POLE MOTOR
Filed Sept. 12, 1958

WITNESSES
John E. Heasley, Jr.
Ernest P. Klipfel

INVENTOR
Glen H. Sherer
BY
ATTORNEY

2,977,490
Patented Mar. 28, 1961

2,977,490
SHADED POLE MOTOR

Glen H. Sherer, Lima, Ohio, assignor to Westinghouse Electric Corporation, East Pittsburgh, Pa., a corporation of Pennsylvania Filed Sept. 12, 1958, Ser. No. 760,750

4 Claims. (Cl. 310—172)

The invention relates generally to shaded pole electric motors, and more particularly relates to a new and improved laminated core structure for such a motor.

In any dynamoelectric machine, core losses play a considerable part in determining the efficiency and temperature rise, and hence the rating, of the machine. In conventional shaded pole motors, the eddy current loss in the magnetic pole pieces can noticeably reduce the motor efficiency and increase line current. In the conventional shaded pole motor core, the steel laminations are held together by rivets, with generally one rivet in each pole, to make a rigid assembly and reduce the possibility of noise. This rivet is conventionally located symmetrically of the pole and as near to the through bolt as possible. The through bolt is used to secure the end brackets to the core structure.

With the rivet conventionally located as near to the through bolt as possible, considerable flux will flow between the rivet and the shading coil, both of which make good electrical contact with the laminations. Hence, a closed conductive path is formed around this flux and eddy currents are induced in the path, resulting in an energy loss and lowering the motor efficiency.

The principal object of my invention is to provide a shaded pole motor construction having improved performance characteristics.

Another object of my invention is to provide a core structure for a shaded pole motor having reduced core losses.

Another object of my invention is to provide a laminated core structure for a shaded pole motor having increased resistance to eddy currents.

Further objects and advantages of my invention will be more readily apparent from the following detailed description, taken in connection with the accompanying drawing, in which.

Figure 1:
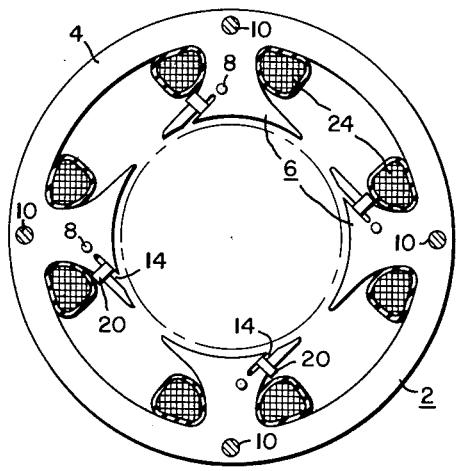
Figure 1 is an elevation view of a shaded pole motor core structure embodying my invention and a main electrical winding mounted thereon.

I have chosen to illustrate my invention in a shaded pole motor core having a stack of laminations 2 of a suitable magnetic material. Each lamination 2 has a yoke portion 4 and a plurality of salient pole pieces 6 integral with the yoke portion 4. A rivet 8 extends through each of the pole pieces 6 to clamp the laminations 2 together so as to make a rigid assembly and reduce the possibility of noise. The location of the rivet 8 in each pole piece 6 will be discussed more fully. Through bolts 10 are disposed in the yoke portion 4 and extend through the laminations 2 for the purpose of securing end brackets (not shown) to the core structure.

Each pole piece 6 has a slot 14 dividing the pole piece 6 into an auxiliary portion 16 and a main portion 18. A shading coil 20 is mounted over the auxiliary portion 16 of the pole piece 6 with one side 22 of the shading coil located in the slot 14. Means for inducing the flow of magnetic flux in the core is shown as a main field winding 24 disposed about the neck portion 26 of each of the pole pieces 6. The magnetic flux path in each pole is shown as comprising three parts, $\phi$, $\phi_2$, and $\phi_3$. The magnitude of the flux is not necessarily equal for the three paths. For proper performance of the shaded pole motor it is necessary that more flux flow through the main portion 18 of the pole piece 6 than the auxiliary portion 16. Since the flow of flux entering the pole piece 6 from both sides is equal, it necessarily follows that part of the flux flowing through the main portion 18 must enter by the flux path $\phi_3$. As shown, the flux $\phi_1$ passes through the auxiliary portion 16 while the flux $\phi_2$ passes through the main portion 18. $\phi_3$ represents that portion of the flux coming from the shaded side of the pole which necessarily flows through the main portion 18 because of the lesser resistance or reluctance offered by the larger cross sectional area of the main portion 18 of the pole piece 6.

Figure 2:
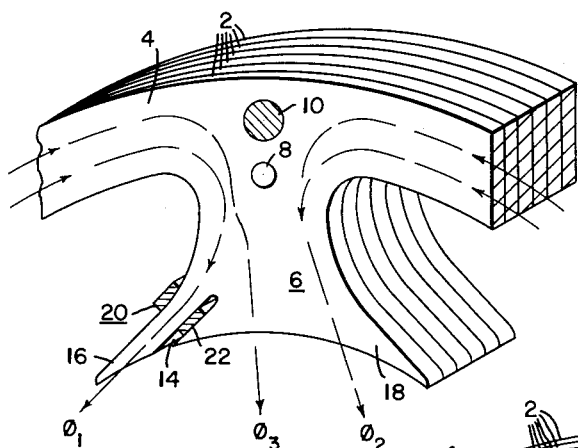
Fig. 2 is an enlarged fragmentary view of a shaded pole induction motor core of the conventional type.

As mentioned previously, when the rivet 8 is conventionally located symmetrically of the pole piece 6 (Fig. 2) and as close to the through bolt 10 as possible, the path of flux $\phi_3$ is located between the side 22 of the shading coil 20 and the rivet 8. Since both the rivet 8 and the shading coil 20 make good electrical contact with the laminations 2, a local closed eddy current path of relatively low resistance is created. The flux $\phi_3$ therefore induces an electromotive force in this closed circuit. The eddy current caused by this electromotive force is equal to the electromotive force divided by the resistance of the closed path. Power dissipated in this closed eddy current path, neglecting its inductance, which is extremely low compared to its resistance, is hence equal to the square of the electromotive force divided by the resistance of the path. With the low resistance of the closed path the power loss is great.

Figure 3:
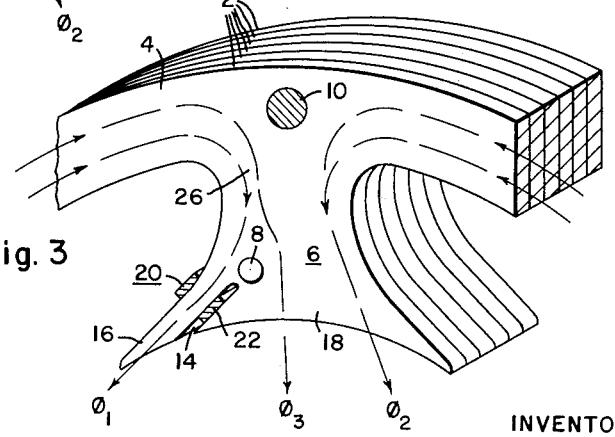
Fig. 3 is a fragmentary view of the shaded pole motor core structure shown in Fig. 1.

An inexpensive and effective way to reduce these losses is to relocate the rivet 8 as close as possible to the slot 14 and hence the side 22 of the shading coil 20. In accordance with my invention, as shown in Fig. 3, the rivet 8 is located closely adjacent to the slot 14. If desired, the rivet 8 can be located closely adjacent to and on the axis of the slot 14. It is to be understood that if this location of the rivet becomes a serious problem in the construction of the die for punching the laminations 2, then the hole for the rivet 8 may be formed as a part of the shading slot 14 by providing an enlargement at the upper end of the slot 14.

With the rivet 8 located as shown in Fig. 3, the flux $\phi_3$ will have a path between the rivet 8 and the through bolt 10. With such a location of the rivet 8 it is no longer possible for any substantial portion of the flux $\phi_3$ to pass between the rivet 8 and the side 22 of the shading coil 20. Substantially all of the flux $\phi_3$ passes between the rivet 8 and the through bolt 10. Thus, there is no good path for eddy current to flow. If there is any circuit at all it is through the rivet 8 and the through bolt 10. However, the through bolt 10 makes only a loose contact with the laminations 2 and necessarily provides a high resistance to eddy current flow. This eddy current circuit therefore offers a much greater resistance path than the path previously had with a conventional stator. Since the resistance of the new eddy current circuit is high, the electromotive force induced by the flux $\phi_3$ will cause a much smaller eddy current to flow. The result is a reduction in eddy current losses and hence total core losses in the shaded pole motor.

It is now readily apparent that my invention has provided a laminated core construction for a shaded pole motor which reduces core losses as compared with the conventional construction. Local heating of the laminations 2 has been reduced with a resultant increased efficiency and a greater output rating for the shaded pole motor. The line current to the shaded pole motor is reduced.

While my invention has been described with a certain degree of particularity, it is to be understood that all variations, alterations and equivalents within the spirit and scope of my invention are meant to be included. While a four pole shaded pole motor construction has been illustrated, it is to be understood that my invention is equally applicable to a core structure of any number of magnetic poles.

I claim as my invention:

1. A core structure for a dynamo-electric machine comprising a stack of laminations having a yoke portion and a plurality of salient pole pieces, each of the pole pieces having a slot therein for reception of a shading coil, and a rivet passing through each of the pole pieces to clamp the laminations together, said rivets being disposed closely adjacent said slots in a position such that the space between the rivet and the slot is substantially impassable to magnetic flux.

2. A core structure for a dynamo-electric machine comprising a stack of laminations having a yoke portion and a plurality of salient pole pieces, each of the pole pieces having a slot therein for reception of a shading coil, and a rivet passing through each of the pole pieces to clamp the laminations together, said rivets being disposed closely adjacent said slots with a restricted space substantially impassable to magnetic flux between the rivet and the slot.

3. An electric motor having a laminated stator core, said core having a yoke portion and a plurality of salient pole pieces, each pole piece having a slot therein, shading coils disposed in said slots, field windings on the pole pieces, and a rivet passing through each of the pole pieces to clamp the laminations of the core together, the rivets being located in each pole piece in a position such that the space between the rivet and the shading coil is substantially impassable to magnetic flux.

4. An electric motor having a laminated stator core, said core having a yoke portion and a plurality of salient pole pieces, each pole piece having a slot therein, shading coils disposed in said slots, field windings on the pole pieces, and a rivet passing through each of the pole pieces to clamp the laminations of the core together, the rivets being located in each pole piece closely adjacent said slots with a space substantially impassable to magnetic flux between the rivet and the shading coil.

References Cited in the file of this patent

UNITED STATES PATENTS

| | | |
|---|---|---|
| 1,823,979 | Jordan | Sept. 22, 1931 |
| 2,064,090 | Sullivan et al. | Dec. 15, 1936 |
| 2,278,139 | Puchy | Mar. 31, 1942 |
| 2,726,344 | Neuenschwander | Dec. 6, 1955 |